United States Patent Office 3,201,440
Patented Aug. 17, 1965

3,201,440
HALOALKYLDIHYDROXYOXAHEXYL HYDRO-
CARBONTHIOPHOSPHONATES
David D. Reed, Glenham, N.Y., James M. Petersen, Fish-
kill, N.Y., and Herman D. Kluge, deceased, late of
Fishkill, N.Y., by Hazel E. Kluge, administratrix, Fish-
kill, N.Y., assignors to Texaco Inc., New York, N.Y., a
corporation of Delaware
No Drawing. Filed Oct. 18, 1962, Ser. No. 232,646
8 Claims. (Cl. 260—461)

This invention relates to novel reaction products of haloalkylhydroxyalkyl hydrocarbonthiophosphonates and hydroxyepoxyalkanes. More particularly, it pertains to haloalkyldihydroxyoxahexyl hydrocarbonthiophosphonates and their method of manufacture.

The hydroxyepoxyalkane hydrocarbonthiophosphonate reaction products contemplated herein have been found to be effective as thermal stability additives for fuels, e.g., jet fuels.

The haloalkyldihydroxyoxahexyl hydrocarbonthiophosphonates, hereafter known as the oxahexyl thiophosphonates for reasons of brevity, are represented by the following formula:

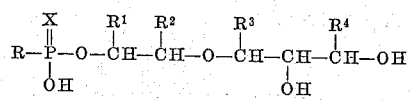

where R is a monovalent hydrocarbon derived radical (hydrocarbyl), $R^1$ and $R^2$ are radicals selected from the group consisting of hydrogen, alkyl of from 1 to 6 carbon atoms and halogenated alkyl radicals from 1 to 6 carbon atoms, at least one of said $R^1$ and $R^2$ groups being haloalkyl, $R^3$ and $R^4$ are radicals selected from the group consisting of hydrogen and alkyl from 1 to 6 carbon atoms, and X is sulfur or a mixture of sulfur and oxygen. By the term "haloalkyl" we intend alkyls having one to all of the hydrogens thereon substituted with halogen.

Broadly, the novel compounds of the invention are prepared by reacting at elevated temperatures a hydroxyepoxyalkane with a haloalkylhydroxyalkyl hydrocarbonthiophosphonate and optionally in the presence of an acid as catalyst such as Lewis acids, organic acids, and mineral acids.

PREPARATION OF THE HALOALKYLHYDROXY-
ALKYL HYDROCARBONTHIOPHOSPHONATE
REACTANT

The haloalkylhydroxyalkyl hydrocarbonthiophosphonates and their method of manufacture are described in coassigned, copending application Serial No. 232,659, filed October 18, 1962. As described therein the haloalkylhydroxyalkyl hydrocarbonthiophosphonates are derived from hydrocarbonthiophosphonic acids and haloalkylene oxide and in turn the hydrocarbonthiophosphonic acid is derived from a hydrocarbon-$P_2S_5$ reaction product. In the preparation of the hydrocarbonthiophosphonic acid, a reaction mixture of $P_2S_5$ and hydrocarbon comprising 5–40 wt. percent $P_2S_5$ is heated at a temperature between about 100–320° C. in a non-oxidizing atmosphere, for example, under a blanket of nitrogen. The resultant product is hydrolyzed at a temperature between about 100 and 260° C. by contacting with steam. The steam treatment converts the hydrocarbon-$P_2S_5$ reaction product to a hydrocarbonthiophosphonic and inorganic phosphorus acids. The hydrocarbonthiophosphonic acid is of the general formula:

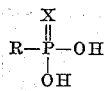

wherein R is the charged hydrocarbyl radical, e.g., of 20 to 200 carbon atoms and X is sulfur or a mixture of oxygen and sulfur. X in the above formula is designated sulfur or a mixture of sulfur and oxygen because the steam hydrolysis treatment often results in replacement of a portion of sulfur joined to the phosphorus with oxygen.

The monovalent hydrocarbon derived radical represented by R in the previous formula is derived from the hydrocarbon which formed the initial hydrocarbon-$P_2S_5$ reaction product. The hydrocarbons utilized can be aliphatic, cycloaliphatic, aromatic, alkarene or aralkane hydrocarbons. Lubricating oil fractions and cracked hydrocarbon fractions also comprise another desirable class of hydrocarbon materials for reaction with $P_2S_5$.

The preferred hydrocarbons for reaction with $P_2S_5$ are olefins. The olefinic hydrocarbons advantageously contain at least 12 carbon atoms although lower molecular weight olefins can be employed. Examples of mono-olefin polymers are polyisobutylene, polybutylene, polyproylene. Copolymers of olefins illustrate another type such as the copolymer of butadiene and isobutylene. Generally, olefin polymers and copolymers having an average molecular weight between 250 and 50,000 are employed. Polymers and copolymers having an average molecular weight from 600 to 5,000 are preferred. One specific preferred mono-olefin polymer is polybutene having an average molecular weight between 600 and 5,000.

Examples of haloalkylhydroxyalkyl hydrocarbonthiophosphonates reactants contemplated herein are 3-chloro-2-hydroxypropyl polybutene (780 M.W.) thiophosphonate, 3-chloro-2-hydroxypropyl polybutene (940 M.W.) thiophosphonate, 1-fluoromethyl-2-hydroxy-3-fluoropropyl polybutene (1200 M.W.) thiophosphonate, 1-1',2'-dibromoethyl)-2-hydroxy-3-bromopropyl polybutene (1200 M.W.) thiophosphonate, and 3-bromo-2-hydroxypropyl polyisobutylene (2500 M.W.) thiophosphonate.

HYDROXYEPOXYALKANE REACTANT

The hydroxyepoxyalkanes suitable for reaction with the thiophosphonate reactant for forming the desired oxahexyl thiophosphonates of the invention have the general formula:

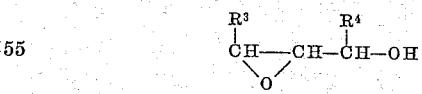

where $R^3$ and $R^4$ are hydrogen or an alkyl from 1 to 6 carbons. Examples of the hydroxyepoxyalkane contemplated herein are 3-hydroxy-1,2-epoxypropane, 4-hydroxy-2,3-epoxybutane and 3-hydroxy-3-ethyl-1,2-epoxypropane.

ACID CATALYST

As heretofore stated, a catalyst may be employed in the preparation of the oxahexyl hydrocarbonthiophosphonates. The catalyst contemplated herein are the Lewis acids, mineral acids and organic acids. Specific examples of such catalyst are $BF_3 \cdot C_2H_5OC_2H_5$ (boron trifluoride etherate), $BF_3$, HF, $AlCl_3$, $SnCl_4$, $TiCl_4$, $ZnCl_2$, $H_3PO_4$, $H_2SO_4$ and $CCl_3CO_2H$.

PREPARATION OF THE OXAHEXYL HYDROCARBONTHIOPHOSPHONATE PRODUCT

Specifically, the oxahexyl hydrocarbonthiophosphonate product is prepared by reacting the haloalkylhydroxyalkyl hydrocarbonthiophosphonate with the hydroxyepoxyalkane with or without the presence of an acid substance as catalyst at a temperature between about 25 and 150° C., in a reactant mole ratio of hydroxyepoxyalkane to thiophosphonate reactant to catalyst of between about 0.1:1:0.01 and 5:1:0.1. Although superatmospheric and subatmospheric pressure may be employed, atmospheric pressure is normally utilized.

The product is purified by standard means such as stripping out the unreacted reactants at elevated temperature (e.g., above 75° C.) and reduced pressure (between 0.1 and 30 mm. Hg) utilizing an inert gas such as nitrogen as stripping agent.

Specific examples of the oxahexyl hydrocarbonthiophosphonates contemplated herein are 2-chloromethyl-5,6-dihydroxy-3-oxahexyl polybutene (940 M.W.) thiophosphonate; 2-bromomethyl-5,6-dihydroxy-3-oxahexyl polybutene (940 M.W.) thiophosphonate; 1,2-di(fluoromethyl)-4,6-diethyl-5,6 - hydroxy - 3-oxahexyl polypropylene (1500 M.W.) thiophosphonate; and 1-ethyl-2-(chloromethyl)-4-methyl-5,6-dihydroxy-3-oxahexyl polymethylene (2500 M.W.) thiophosphonate.

The following examples further illustrate the invention by demonstrating the preparation of the oxahexyl thiophosphonates but are not to be construed as limitations thereof.

Example I 355 grams of a mineral oil solution containing 0.1 mole of 3-chloro-2-hydroxypropyl polybutene (940 M.W.) thiophosphonate of the formula:

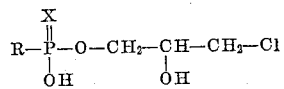

where R is a polybutene radical having an average molecular weight of 940 and X is a mixture of oxygen and sulfur (0.5 wt. percent sulfur) were added to a 1 liter, 3-necked flask equipped with a stirrer, dropping funnel, gas inlet tube, thermometer and reflux condenser. In addition 7.5 grams (0.1 mole) of glycidol and 1.4 (0.01 mole) boron trifluoride etherate were added. The reaction mixture was heated to 93° C. with stirring and nitrogen blowing for a period of 2 hours. At the end of the reaction period the unreacted epoxy reactant was stripped out with nitrogen at a temperature of 93° C. under a pressure of 1–2 mm. Hg. The stripped product was indentified as 2-thiophos-Hg. The stripped product was identified as 2-chloromethyl-5,6-dihydroxy-3-oxahexyl polybutene (940 M.W.) thiophosphonate of the formula:

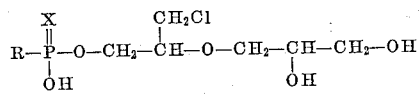

where R is a polybutene radical having an average molecular weight of 940 and X is a mixture of sulfur and oxygen. This product analyzed as follows:

| Description | Calculated | Found |
|---|---|---|
| Phosphorus, wt. percent | 0.85 | 1.0 |
| Hydroxyl No | 27 | 25 |
| Neut. No | 0 | 2.44 |

Example II

The procedure of Example I was repeated except no catalyst was employed. Further, the thiophosphonate reactant was 276 grams of a mineral oil solution containing 0.105 mole of 3-bromo-2-hydroxypropyl polybutene (940 M.W.) thiophosphonate of the formula:

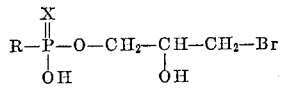

where R is a polybutene radical having an average molecular weight of 940 and X is a mixture of oxygen and sulfur (0.5 wt. percent sulfur). Also, 7.8 grams (0.105 mole) of glycidol were employed. The stripped product was found to be 2-bromomethyl-5,6-dihydroxy-3-oxahexyl polybutene (940 M.W.) thiophosphonate of the formula:

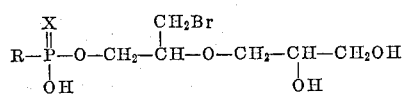

where R and X are as heretofore defined. This product analyzed as follows:

| Description | Calculated | Found |
|---|---|---|
| Phosphorus, weight percent | 1.19 | 1.1 |
| Hydroxyl No | 43 | 30 |
| Neut. No | 0 | 0.54 |
| Mole ratio, glycidol/thiophosphonate reactant in product | 1 | 1 |

We claim:

1. A haloalkyldihydroxyoxahexyl hydrocarbonthiophosphonate of the formula:

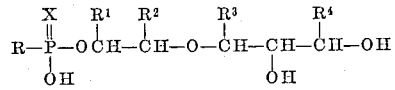

where R is hydrocarbyl derived from an aliphatic polyolefin having an average molecular weight between 250 and 50,000, $R^1$ and $R^2$ are selected from the group consisting of hydrogen, alkyl from 1 to 6 carbons and haloalkyl from 1 to 6 carbons, at least one of said $R^1$ and $R^2$ groups being said haloalkyl, $R^3$ and $R^4$ radicals selected from the group consisting of hydrogen and alkyl of from 1 to 6 carbons and X is a chalcogen selected from the group consisting of sulfur and a mixture consisting of a major portion of sulfur and a minor portion of oxygen.

2. A thiophosphonate in accordance with claim 1 wherein, X is a mixture consisting of a major portion of sulfur and a minor portion of oxygen, $R^1$, $R^3$ and $R^4$ are hydrogen and $R^2$ is haloalkyl.

3. A thiophosphonate in accordance with claim 2 wherein $R^2$ is chloromethyl.

4. A thiophosphonate in accordance with claim 2 wherein $R^2$ is bromomethyl.

5. A method of preparing a haloalkyldihydroxyoxahexyl hydrocarbonthiophosphonate of the formula:

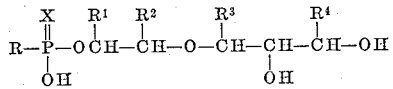

where R is hydrocarbyl derived from an aliphatic polyolefin having an average molecular weight between 250 and 50,000, $R^1$ and $R^2$ are radicals selected from the group consisting of hydrogen, alkyl of from 1 to 6 carbons and haloalkyl from 1 to 6 carbons, at least one of said $R^1$ and $R^2$ groups being haloalkyl, $R^3$ and $R^4$ are radicals selected from the group consisting of hydrogen and alkyl from 1 to 6 carbons and X is selected from the group consisting of sulfur and a mixture consisting of a major portion of sulfur and a minor portion of oxygen, said method comprising contacting a haloalkylhydroxyalkyl hydrocarbonthiophosphonate of the formula:

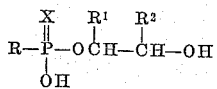

with a hydroxyepoxyalkane of the formula:

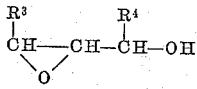

wherein R, $R^1$, $R^2$, $R^3$, $R^4$ and X as are heretofore defined, at a temperature of between about 25 and 150° C., in a mole ratio of said hydroxyepoxyalkane to thiophosphonate reactant of between about 0.1:1 and 5:1.

6. A method in accordance with claim 5 wherein said method is conducted in the presence of said as catalyst, said acid selected from the group consisting of

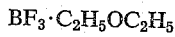

$BF_3$, HF, $AlCl_3$, $SnCl_4$, $TiCl_4$, $ZnCl_2$, $H_3PO_4$, $H_2SO_4$ and $CCl_3CO_2H$ and in a mole ratio of said hydroxyepoxyalkane to said thiophosphonate reactant to said catalyst of 0.1:1:0.01 to 5:1:0.1, $R^1$, $R^3$ and $R^4$ are hydrogen and X is a mixture consisting of a major portion of sulfur and a minor portion of oxygen.

7. A method in accordance with claim 6 wherein R is a polybutene radical having an average molecular weight of 940, $R^2$ is chloromethyl and said catalyst is boron trifluoride etherate.

8. A method in accordance with claim 6 wherein R is a polybutene radical having an average molecular weight of 940, $R^2$ is bromomethyl, and said catalyst is boron trifluoride etherate.

No references cited.

CHARLES B. PARKER, *Primary Examiner.*

IRVING MARCUS, *Examiner.*